United States Patent [19]

Kaplinsky

[11] 4,361,868
[45] Nov. 30, 1982

[54] DEVICE FOR INCREASING THE LENGTH OF A LOGIC COMPUTER ADDRESS

[75] Inventor: Cecil H. Kaplinsky, Eindhoven, Netherlands

[73] Assignee: U.S. Philips Corporation, New York, N.Y.

[21] Appl. No.: 54,534

[22] Filed: Jul. 3, 1979

[30] Foreign Application Priority Data

Jul. 6, 1978 [NL] Netherlands ............... 7807314

[51] Int. Cl.³ .............. G06F 7/00; G06F 9/00; G06F 9/34
[52] U.S. Cl. ................................................ 364/200
[58] Field of Search ... 364/200 MS File, 900 MS File

[56] References Cited

U.S. PATENT DOCUMENTS

| | | | |
|---|---|---|---|
| 3,614,746 | 10/1971 | Klinkhamer | 364/200 |
| 3,725,874 | 4/1973 | Van Heel | 364/200 |
| 3,735,355 | 5/1973 | Balogh et al. | 364/200 |
| 4,044,334 | 8/1977 | Bachman et al. | 364/200 |
| 4,084,227 | 4/1978 | Bennett et al. | 364/200 |
| 4,096,573 | 6/1978 | Heller et al. | 364/200 |
| 4,128,875 | 12/1978 | Thurber et al. | 364/200 |

*Primary Examiner*—Gareth D. Shaw
*Assistant Examiner*—John G. Mills, III
*Attorney, Agent, or Firm*—James J. Cannon, Jr.

[57] ABSTRACT

A data processing machine having a device for extending the length of the logic address to (M+N) bits, so that $2^{M+N}$ different logic addresses can be formed and become available to the programmer. The original data structure of a computer having a word length of only N bits is then maintained. Programs written for the original machine can be executed without modification. A register bank of a data processing machine having its extension has a first section having a width of N bits which forms the least-significant side or tail, and a second section which has a width of M bits and which forms the more significant side or head. The first section is used in all instructions which utilize an operand from a register or which store an operand in a register, in the same manner as in the computer without the extension. The second section is used only if reference is made to the memory while using a register as a base register or as an index register; or if a special, new instruction is issued in order to load or store the content of the register thus addressed. The M additional address bits in the extension of the register provide the bits of higher significance in a physical or virtual address. Or they can also provide a segment number which is used in a subsequent conversion of the segmented virtual address into a physical address. In the segmented case, it is not necessary to apply a carry output signal from the section having a width of N bits to the section of the register having a width of M bits.

2 Claims, 7 Drawing Figures

DEVICE FOR INCREASING THE LENGTH OF A LOGIC COMPUTER ADDRESS

BACKGROUND OF THE INVENTION

The invention in general relates to the addressing of elements of a computer memory. For executing a so-called user program, a computer is controlled by user addresses. These addresses are provided by the application program for controlling a memory access specified therein. Such an address specifies a data item, for example, as a given element of a given data file. Addresses of this kind are logic addresses in a sense that they do not relate to the physical organization of the memory. An address of this kind thus comprises a string of bits of successive significance levels, the meaning of the successive bits not being different from each other on the basis of electrical, mechanical or other organizational properties of the memory. Furthermore, the operation of the computer is controlled by one or more instructions. These instructions may have a bit-length which equals a multiple of the standard data word length for which the computer has been designed. The length of the instruction may in some cases also be equal to the word length. A computer which is of relevance for the present invention is the Philips minicomputer P856 M from the P800 series. In this respect, reference is had to the "P800 M Interface and Installation Manual", issued by Philips Data Systems B. V., Apeldoorn, the Netherlands, April 1976, publication number 5122 991 26942. The set of instructions for this computer has been described in the corresponding book "P852 M, Programmers Guide 1 & 2, Vol. 2, Instruction Set, basic/disk operating System", Philips Electrologica MMG-OEM, September 1974, Apeldoorn, the Netherlands, publication number 5122 991 11711.

The word length in said computers amounts to sixteen bits, while usually so-called double length instructions (32 bits) are used. Part of an instruction can be used for addressing a given index register from a set of index registers. The loading of these registers is realized via the normal data channels, for example, the internal data bus of the computer. Therefore, the length of the index registers usually has corresponded to the length of a computer word (i.e. sixteen bits in the example). The content of an index register can directly contain a physical or logic address. In a latter case, said logic address is translated into a physical address by means of a segment or page table. On the other hand, the content of the register may be combined with a predetermined part of the instruction in order to form an address. The latter can again be a physical or a logic address.

It has been found that the word length available for forming logic addresses in a computer system of the described kind is too limited. This is because it is usually impossible to directly address an adequate number of data elements. On the other hand, modification to a larger word length is extremely expensive, because all hardware and software must be adapted to the larger word length.

SUMMARY OF THE INVENTION

The invention has for its object to provide an increased width of the logic addresses for a computer with a predetermined, smaller length of the machine data word, without necessity for modifying existing programs which are based on the shorter word, so that the extended addressing facility would be invisible as if it were for such programs.

The object in accordance with the invention is realized by means of an address generating device for generating physical address data for use in a machine for processing digital data. This device includes an instruction register having an input of a predetermined bit width for receiving a bit string in said register in order to act as an instruction. This instruction register comprises a first output for dispatching an operation code which is contained within said instruction, a second output for despatching an index register address for addressing a specified index register from an index register bank, and a third output for despatching a first memory subaddress. The index register thus addressed comprising a fourth output for dispatching a predetermined number of more significant bits embodied therein, and a fifth output for despatching a predetermined number of less significant bits embodied therein, the latter bits acting as a second memory sub-address, the combined bit width of said fourth and fifth outputs being larger than said predetermined bit width. There is also provided combinatory logic having inputs which are connected to said third and fifth outputs for the linear combining of said first and second memory sub-address in order to generate further less significant address bits which form, in conjunction with said more significant bits, a complete memory address to be produced on a sixth output of said combinatory logic. The fourth output is connected to an address input of a segment table device which contains a number of respective storage locations, each of which accommodates a segment base idenfication, and a seventh output for despatching an addressed segment base identification, said seventh output having a bit width which at least equals first bit width. The sixth and seventh outputs are connected to inputs of output adder in order to produce an absolute address on an eighth output of said output adding means.

Thus, an increased address length is produced without it being necessary to provide elements within the computer with separate bit devices (bit slices). When an index register has a length which corresponds to the length of two machine words, the filling of the entire length thereof requires two machine cycles. In most cases it is sufficient to load the less-significant part thereof which has a length of a single machine word. This is because the more significant part of the content of the index register may remain unmodified during the execution of large parts of a program; it will only occasionally be necessary to fill the entire index register. The index register will usually be present in the form of a physical register comprising flipflops. It is alternatively possible for the index registers to form a predetermined storage area within a memory, for example, a part thereof. The formation of a linear combination of first and second memory sub-address can be realized in various manners. An attractive method consists in that the two subaddresses are added. A further attractive method is formed by concatenation. The latter is realized by formation of a bitwise inclusive-OR-function, subject to the restrictive condition that corresponding bit positions may not both contain a logic "1"; therefore, if one of the bits series to be concatenated contains a significant data bit (which may have the value "0" or "1" in a given position, the other one of these two bit series must definitely contain a logic "0" in this position. Generally, the values of logic "0" and "1" may be interchanged in the foregoing, subject to a corresponding adaptation of the logic function. The combined width of said fourth and fifth outputs is thus available for a user program which is executed in the computer and which thus has an increased logic address space available. The advantages of such an increased address space consist in the possibility of executing long programs having a complex structure, and the addressability of larger data files.

Specifically, U.S. Pat. No. 3,949,378 discloses the provision of an instruction register which in the first place addresses an index register and also contains a first memory subaddress. Furthermore, in two successive additions the contents of an addressed index register, the first memory subaddress and also the contents of a base register are added. In this known design the physical address is lengthened for allowing a larger physical memory to be addressed. A plurality of program modules may thus operate in a larger memory than originally provided. However, this prior art specifically couples each index register to one specific base register by a hardware control. Also both thus linked registers are directly addressed by the contents of the index register. Furthermore, the length of the index register is only exactly as long as the length of said first memory subaddress. Thus, prior art offers little flexibility. Loosening the tight linking described hereabove would cost additional instruction bits, which is detrimental. Consequently, the prior art does not consider the execution of longer programs but the provision for executing a plurality of parallel resident program modules, whereby each module addresses only its own part of Memory. In contradistinction, the index designator of the present invention addresses an index register and thereafter addresses a segment table. The segment table entry may have both segment base and segment length indicators and the number of segments present is not related to the number of index registers. Memory thus becomes transparent because the non-dedicated parts thereof remain invisible to each program.

FURTHER ASPECTS OF THE INVENTION

Preferably, said second bit width lies between ($\geq$) $1\frac{1}{4}$ and ($\leq$) $1\frac{3}{4}$ times said first bit width. On the one hand, this results in a substantially increased length of the logic address. On the other hand, the number of components to be added remains limited. In the embodiment to be described hereinafter, said ratio is $1\frac{1}{2}:1$. On the other hand, a larger ratio may be advantageous in given cases, for example, 2:1 or even larger. A said segmentbase identification is always a physical address. Thus, extension of the length of the logic address is attractively used in an address segment organization. If desired, the described idea of the invention can also be used, when the output adding means have a bit width which is smaller than said first bit width. However, it is very attractive when the bit width of said seventh output lies between ($\geq$) 1 and ($\leq$) $1\frac{1}{2}$ times said first bit width. In the embodiment to be described hereinafter, the ratio $1\frac{1}{4}$, with the result that a favorable balance exists between the additions to the equipment and the possibilities extended thereby.

Preferably, the storage locations have a storage capacity for a segment upper bound identification, the segment table comprising a ninth output for dispatching a segment upper bound identification for a storage location thereof containing this identification. Thus, attractive means are realized for achieving a memory protection in order to prevent overflow beyond the bounds of a segment due to incorrect programming.

BRIEF DESCRIPTION OF THE DRAWINGS

The invention will be described in detail hereinafter with reference to the following Figures.

DETAILED DESCRIPTION OF THE INVENTION

For a better understanding of the invention, reference is first made to the term "virtual memory". An example of an organization involving a virtual memory is found in the combination of a fast foreground memory, having a comparatively small capacity, and a slower background memory having a larger capacity. Depending on the ratios of the speeds and the capacities and the correlation within a series of addresses successively generated by the user device (for example, the central processor), the virtual capacity equals that of the large background memory, while the speed can approach that of the foreground memory. In this case, the background memory may be thought of as a "virtual memory"; even though it is not directly accessible, the entire organization of the cpu plus the memory acts as if this is the case. In this case a longer logic address enhances the addressing possibilities.

On the other hand, a "transparent memory" may also be defined. Contrary to the above case, the organization of user device plus memory acts as if the transparent memory is absent. The length of the logic address in a computer determines the number of different memory locations (for example, memory words) which can be reached by this address. If the length of the logic address is shorter than the value corresponding to the physical dimensions of the memory, a part thereof cannot be readily addressed. The mapping of the logic addresses on the physical addresses is realized by means of a mapping mechanism which is controlled by the supervision program (operating system) rather than by the user program. The memory which cannot be addressed is "transparent" as if it were. Notably in the latter case, it is advantageous to create a logic address of larger length, because the possibilities of addressing are directly enhanced thereby. An example of a transparent memory organization is given by the cited U.S. Pat. No. 3,949,378 (notably in element 42).

Figure 1:
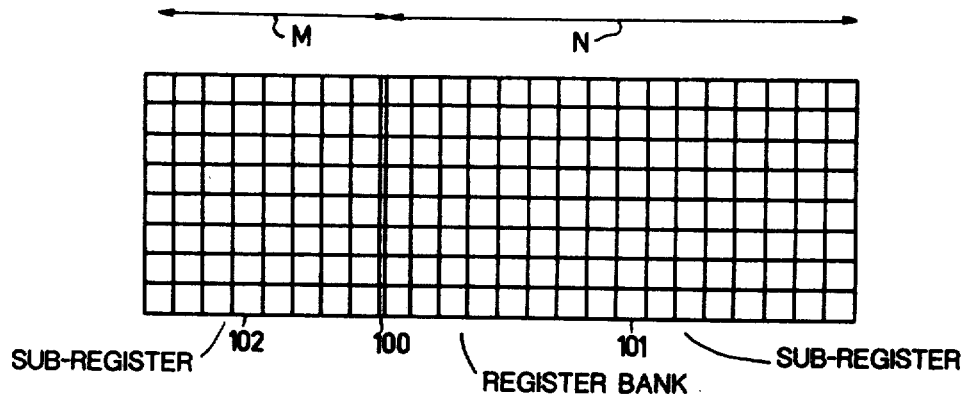
FIG. 1 shows a register bank to be used as an index register bank.

In this respect, FIG. 1 shows an index register bank. The physical realization (flipflop registers, specific part of the machine memory, read/write part of the control memory) is not relevant at the system level of the invention. Index registers are well known from the digital computer art and are also implemented in the Philips P856 computer as a flipflop registers. The interface between the instruction format and the addressing organization will be described with reference to FIGS. 2, 3. In accordance with the invention, the programmer or the program has available a logic address space of $2^{M+N}$ addresses. Known logic address organization of this computer series have an address width of N=16 bits or 64k addresses, which has often been found insufficient. In accordance with the embodiment to be described hereinafter, M=8, so that 4M memory locations could be addressed. Other suitable values could be M=4, M=12, M=16 and in given cases even a value M>16 may be chosen. However, the structure of the computer whereto the extension is added continues to be based on an address length of N (in this case 16 bits). Therefore, programs written for the original address length remain suitable in unmodified form.

The register bank 100 comprises a first subregister 101 which is shown as the least significant part (tail). This part, having a width of N bits, is used in exactly the same manner as in the computer without the logic address extension in executing instructions which operate on operands from the registers. The second register part 102 is shown as a more significant part (head), having a width of M bits, and is used in two specific situations. The first situation occurs when the memory access is effected using a register as the index register or base register, which means when a form of relative addressing is used. Conventionally, the difference between a base register and an index register is that only the latter's contents are available for executing an arithmetic processing thereof (exclusive of the address calculation proper). A read operation of the entire width of register bank 100 is executed then. This will be explained with reference to FIG. 3.

The second situation in which the register part 102 is active occurs when a specific (new) instruction is executed to control the loading or storing of the register part 102. Generally, this instruction is not included in the original set of instructions, so one of the "free" opcodes will be used therefor. The general instruction format will be explained with reference to FIG. 2. The additional M address bits in the head of the register bank part 102 can provide the more significant address bits of a virtual address. A virtual address is characterized in that the number of logic addresses which can be formed is larger than the number of address locations physically present. Alternatively, the additional address bits can provide a segment number for use in a subsequent translation of the segmented (i.e. virtual) address into a physical address. It appears that the difference between the two cases consists in that in the latter case it is not necessary to enable a carry output signal from the part of the register having a width of N bits to the part having a width of M bits. Generally, FIG. 1 refers to items 3,4 in FIG. 3 yet to be described.

Figure 2:
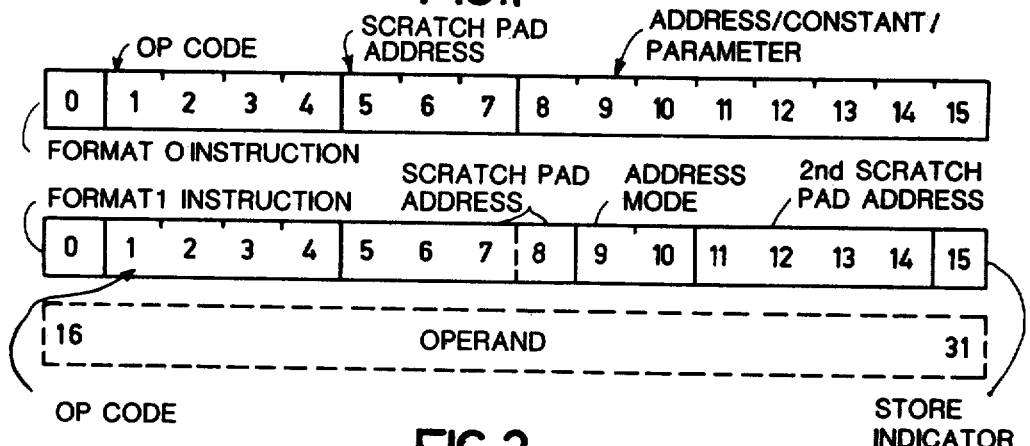
FIG. 2 shows the composition of some known instructions.

FIG. 2 shows some known instruction formats for the described P856 computer. The first line shows a so-called "format 0" instruction, which is signalled in that the instruction bit 0 always has the logic value "0". The instruction bits 1 to 4 contain a four-bit op(eration) code. The instruction bits 5-7 can contain an address of a scratch pad register. The instruction bits 8-15 can contain, for example, an eight-bit positive constant, the address of a peripheral apparatus (when an I/O instruction is concerned) plus specific function bits, or a fixed parameter quantity.

The second and the third line together show a so-called "format 1" instruction for executing a number of operations by referring to two of the sixteen general purpose registers available in the cpu for access by a user program. One of these registers, addressed by the instruction, may contain indication information to a word location in the main memory, because this word location can be used as an index register. In this case, the format of the instruction is given in that the instruction bit 0 always has the logic value "1". The instruction bits 1-4 again contain a four-bit operation code. The instruction bits 5-8 contain the address of a scratch pad register, so that now sixteen registers can be addressed instead of only eight. The instruction bits 9-10 contain the code which indicates the mode of addressing used. These bits indicate how the address for the operand to be used must be calculated. The instruction bits 11-14 can contain the address of a second scratch pad register, similar to the described instruction bits 5-8. The instruction bit 15 contains an indicator "load-store" which is used in given instructions in order to indicate that the result of the operation must either be stored in the register indicated by the instruction bits 5-8 or in a word location of the main memory. The sixteen less significant instruction bits 16-31 are denoted by broken lines; they may contain an operand if so indicated by one or more of the values of the sixteen more significant bits. The foregoing is a limited selection from the set of instructions of said computer series and has been implemented thus far exclusively by means of registers having a length of sixteen bits.

Figure 3:
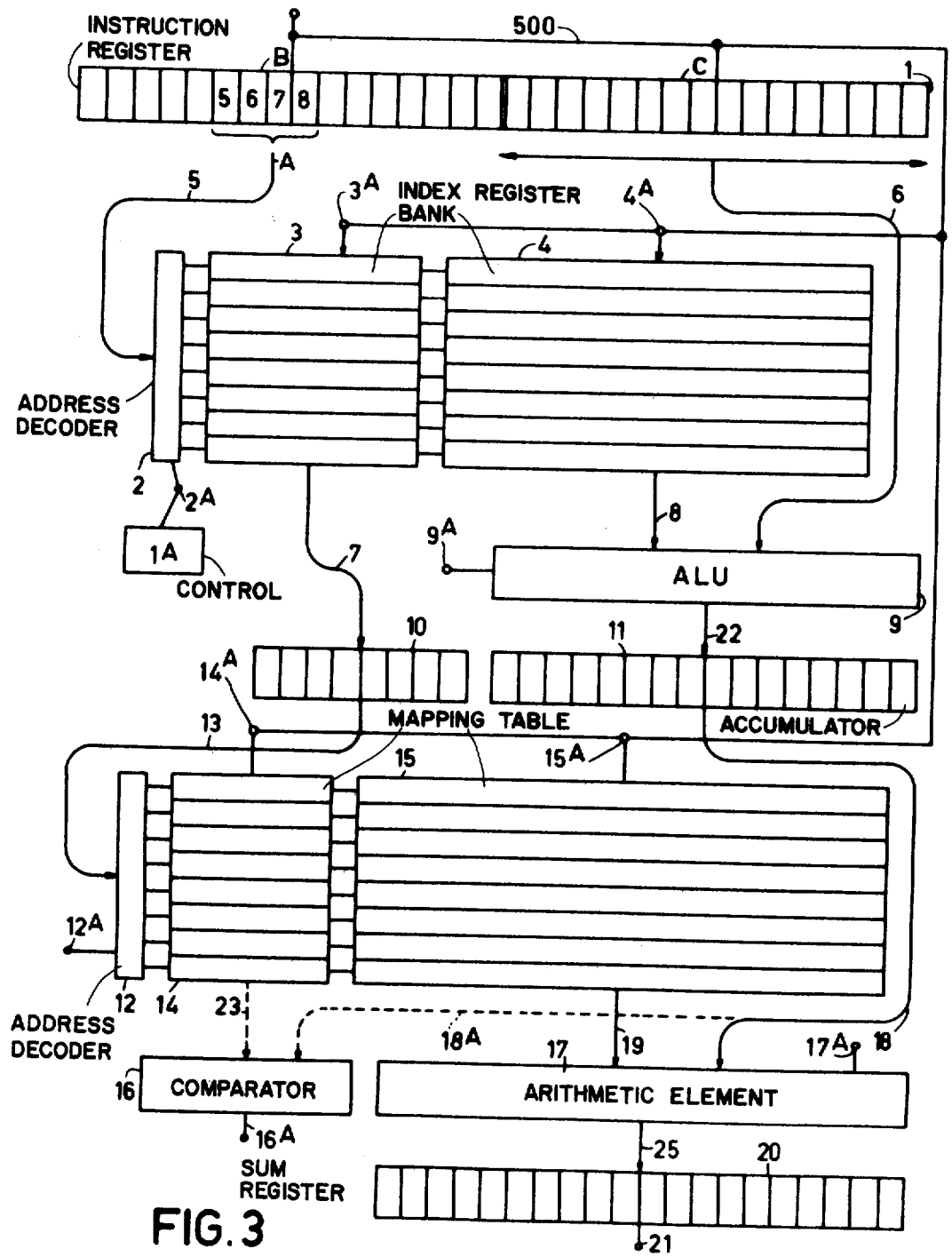
FIG. 3 shows an example of an addressing organization.

In this respect, FIG. 3 illustrates the new addressing system in accordance with the invention which is implemented under the control of an instruction in the "indexed address in next word" (TS) mode. In this case, the length of the instruction equals two computer words of 32 bits. This mode is known per se from said book "P800 Programmer's Guide". The method of loading of instruction register 1 is not described for the sake of brevity; it takes place in one or two cycles via the data bus line 500. The first machine word is situated in the left half B of the instruction register and contains as most significant bit the 0-bit which indicates the format "1", the operating code, the definition of the "long constant mode", and, if necessary, further control bits which are now shown for the sake of brevity (see also the Systems Handbook, p. 7.4.) The bits 5-8 at A identify an index register. The second computer word of sixteen bits is present in the right half C of the instruction register 1 and contains a sixteen-bit address. Under the control of a synchronization signal (not shown), for example, from a central clock, and controlled by microcode to be described with respect to a flow chart (FIG. 7), the execution of the instruction is started by transportation of the four-bit address at A, via the line 5, to the address register annex address decoder 2 of the index register bank which furthermore comprises the storage sections 3 and 4. The The index register bank comprises sixteen separately addressable registers, only eight of which are shown for the sake of simplicity. Each register comprises an eight-bit section in the bank 3 and a sixteen-bit section in the bank 4. These two banks have been executed as physically separate units; however this distinction may alternatively be imaginary. Index registers are widely known in computer art, for example from the IBM 360 series; they are used for the storage of reference addresses in an organization for the modification of addresses. As a result of such an organization, it is sufficient to use instructions of limited length for execution of a given program. According to this addressing the entire index register addressed is read during a first operation step, for which purpose a read signal is also received on the line 2A from the control device 1A, the latter symbolizing the microcode control. This element in this respect is the known operation code decoder in said computer series in order to supply a read control signal to an addressed index register; the difference with respect to the known device consists in the longer length of this register. Thus, 8, 16 and 16 address bits are available on the lines 7, 8 and 6, respectively. Subsequently, during a first arithmetic step two sixteen-bit address data on the lines 8 and 6 are linearly combined in a sixteen bit arithmetic ALU element 9 which is synchronized by a control signal on line 9A, again under microcode control. The linear combination may be an adding operation. Alternatively, it may also be a concatenation. If two words of six bits are 000011 and 010000, the result of the concatenation is 010011, subject to the condition that the bits in the underlined parts of the words must always have the value zero and that the concatenation must be bit-wise executed by way of a logic OR-function. The concatenation function is generally known as an ALU-executable function. If preferred, synchronization of the concatenation function in arithmetic element 9 may be omitted.

In the case of an addition, the sum (and in the case of a concatenation the result of this concatenation) is applied, via line 22, to accumulator register 11 which also has a capacity of sixteen bits. It can be controlled for this storage together with the arithmetic element 9. The eight bits which have become available on the line 7 are stored together therewith in register section 10. The storage in the register sections 10, 11 is effected under microcode control not separately shown. Thus, register sections 10,11 together accommodate a logic address of 24 bits whereby an address space of 16,777,216 separate information units (for example, bytes or words) can be addressed. This address space is much larger than that which could be addressed by an address having a length of exactly one computer word of 16 bits; the computer series in question was originally designed for a 16 bit word length. In principle, the combined register sections 10, 11 could contain a physical address for directly addressing a memory location. In that case, the data outputs of this register would be directly connected to address inputs of the memory. However, in the preferred embodiment, the register section 10 contains an address for addressing a segment table, and the register 11 contains a displacement quantity. Such a displacement quantity is of significance in combination with a base address which will be described hereinafter. Subsequently, the content of the register section 10 becomes available on the line 13, while that of the register section 11 becomes available on the line 18. Under the control of a synchronization signal from the microcode control on the input line 12A of the address register/address decoder 12 of the mapping table device, comprising the mapping table elements 14 and 15, a further read operation takes place. Like the elements 3 and 4, these elements need not be physically separate components of the system; the subdivision may be notional. A mapping table per se is well known from the computer design technique for the storage of address data relating to the paged segmented organization of the memory storage in the computer memory. In this embodiment, the mapping table comprises eight separable data elements, but any number compatible with the memory organization would be useful. The location of the mapping table is subject to the same conditions as the index register bank, i.e. it may be embodied in a number of flipflop registers as well as in a predetermined part of the main memory. The section 15 of the mapping table in this embodiment contains a twenty-bit base address. In another case it would be useful to use a twenty-four bit address for this purpose. The base address is the first address assigned to the segment to be used in the memory. Mapping table sections 14, 15 are loaded by means of the data bus 500 under control of the operating system after a "trap" has occurred, which halts the normal execution. Mapping table section 14 contains a bound-data indication for each table entry. This indication indicates the maximum addressable memory space then assigned to the segment. If the bound indication indicates the absolute upper limit for the memory address which is permissible, going from the associated base address, it should have the same bit width as this base address, i.e. 20 or 24 bits in this example. If the bound indication indicates the upper limit for the permissible displacement indication, a bit width equal to the length of this displacement indication suffices, i.e. sixteen bits in this example (register section 11). The known storage organization in the memory by means of segments or pages is very advantageous, because different pages or segments can be assigned to different (sub) processes, so that the operation of the computer is more flexible. Subsequently, under the control of the synchronization signal on the terminal 12A, the two addressed address parts thus become available on the lines 23 and 19, respectively. Subsequently, during a second arithmetic step, the data on the line 18 and those on the line 19 are added in the arithmetic element 17. To this end, the element can again be activated by a synchronization signal on terminal 17A, emanating from the microcode control; the resulting sum is applied, via the line 25, to the sum register 20 which has the same length as the part 19 of the mapping table device, i.e. 20 or 24 bits, respectively. The storage can be controlled by the same signal as present on the input 17A, even though this has not been shown for the sake of simplicity. Subsequently, on the output 21 (address bus) the physical address appears which is suitable for addressing the computer memory. Furthermore, the bound indication from the table section can be used in a corresponding manner, i.e. for memory protection. If it concerns a relative address indication, the data on the line 18 are applied, via the connection denoted by a broken line and together with the data on the line 23, to the element 16 which in that case operates as a comparator element, which is synchronized, if necessary, by the same signal as present on the terminal 17A. If the amount of the displacement on the line 18 is larger than the value corresponding to the permissible memory space, the element 16 supplies, on the output 16A thereof, a memory overflow signal which blocks the execution of the actual memory access and which terminates the execution of the active program in known manner; in that case an error has occurred, either due to an error in the program, or due to an error in the device (the former case will more frequently occur). This error must be corrected by modification of the program, but the invention does not relate thereto. If the mapping table device in the section 14 defines an absolute address space, a similar comparison as described above is performed in the element 16, but now with respect to the output data of the element 20 on the output 21, the necessary connection not being separately shown in this case. The foregoing description relates to a normal addressing operation where a read operation is executed in respect of the elements 3, 4, 14 and 15. In general, it will also be possible to modify the segment organization. To this end, the elements 14 and 15 comprise data input connections 14A, 15A, respectively. These connections are connected to the internal data bus 500. The latter has a width of one computer word, so sixteen bits, and may receive data, for example, from the data section of the instruction register, i.e. via the line 6, under the control of an operation code reserved for this purpose. Notably in that case it is advantageous for the subdivision into the elements 14, 15 to be notional, so that their capacity is not limited to 16 bits; the loading of these two elements, however, is realized in known manner, for example, by two operation codes which fill the relevant halves of an addressed register of the segment table. The connection to the line 6 is not separately shown. Similarly, the elements 3, 4 comprise load connections 3A, 4A.

The described organization can be implemented in various manners. First of all, it may form an integral part of the design of the computer or computer series or, for example, of more complex members of the computer series, the individual machines of which are more or less compatible. In that case the organization is realized by means of specific logic means and registers as shown in FIG. 3. Control can be realized by one or more expressions of the microcode which controls the internal organization of the machine in known manner. In this respect, reference is already made to the time diagram of FIG. 6, and the flow chart of FIG. 7.

Figure 4:
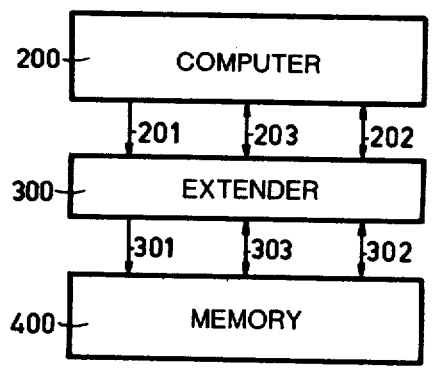
FIG. 4 shows an extension device for use in accordance with the invention.

Alternatively, this organization can be realized by way of a unit which is added to the computer or microcomputer and which operates, for example, as an extender. Reference is made to FIG. 4 in which the extender 300 imparts the same interface to the computer 200 as the memory 400 would do in the case of direct coupling. In this case, the computer is the already described P856 computer, and the memory is the known memory unit commonly used for this computer. In this respect, reference is made to the Philips P856 M/P857 M System Handbook, Philips Data Systems, B.V., publication number 512299126934, April 1978, for example, the sections Memory management unit MMU (p.5.1.), General purpose BUS (p.9.1), Memory (p.4.1). In this respect, therefore, there are present a sixteen-bit unidirectional address bus line (MAD), 201 and 203, respectively, a 16-bit, bidirectional data line BIO, 202 and 302, respectively, and a multiple synchronization and control line 203, 303, respectively, the relevant bit lines of which are operational in one or in both directions in the same manner as in a computer without extender. These signals notably comprise a 1-bit write control signal "WRITE" which originates from the computer 200, and a pair of handshake signals TMRN and TRMN. The former of these two signals is generated by the computer 200, and the latter is the response thereto which is produced by the memory 400 (see said book, page 9-6/7). Said letters have the following meaning: T (transfer), M (from memory), R (to register), N (signals: inverse value). In the extender 300 the instruction signals received are stored and examined. If an instruction (from the instruction register in the computer 200) involves the use of one or more registers in order to derive a base information therefrom, it is checked in the extender whether or not an access fault would occur. This access fault would occur if reference was made to a page or a segment not present in the memory (but rather, for example, in a background memory, such as a magnetic disc memory). If such a fault appears, the extender 300 applies a branch signal to the computer 200, so that the latter starts a branch step and moves to a predetermined point within its microprogram by generating a relevant address. A branch step of this kind is known in address segmenting. In a different computer organization, the extender may supply the computer 200 with an interrupt signal. If no fault occurs, the extender connects the data bus lines 202 and 302 and generates the addresses in the described manner. The completion of the operation is signalled by the signal TRMN on the appropriate synchronization connection.

Figure 5:
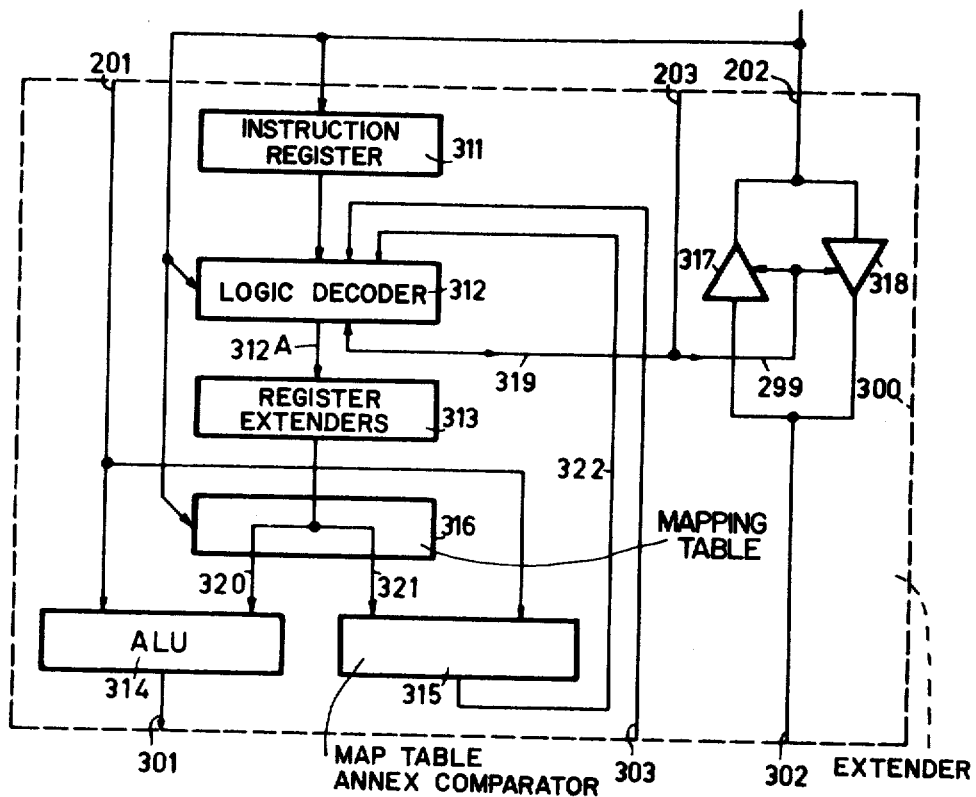
FIG. 5 shows an extension device for use in accordance with the invention.

The extender 300 of FIG. 4 is shown in detail again in FIG. 5; it is particularly suitable for use with the said computer P856 M. The extender is connected to the computer 200 via the address line 201, the data line 202 and the control line 203. It furthermore comprises a sixteen-bit instruction register 311, means for decoding the instruction register and for generating sequence control signals by logic circuits 312, register extenders 313, an arithmetic element ALU for realizing a concatenation and/or adding operation, a mapping table unit annex element for checking the length (314/315), if necessary, for extension of the virtual memory. Notably, element 314 is an ALU.

The instruction register 311 contains a copy of the instruction in the computer 200, as far as the bits 0–15 thereof are concerned and as far as more-word instructions are concerned, it is loaded via the databus. The control for loading this register is not shown for the sake of simplicity; loading can be realized along the same line and together with the corresponding instruction memory in the computer itself. The element 312 first of all comprises a docoder in the form of a programmed logic array for decoding the content of register 311 in respect of the question whether the instruction: (register 311 is the socalled "k-register", Systems Handbook p.2/5)

(a) utilizes a register as an indication of a base information;

(b) is a "special" instruction for loading a predetermined address within the register extensions 313. This instruction can be implemented by means of the known WER (write external register) instruction of the said P800 computer series (see page 9.01 of the "programmer's guide" and page 7/10 of the "Systems Handbook").

The decoder, moreover provides the address for the register extension 313 (loaded via the databus) and the read and write control signals therefor. The latter signals are transported together via the line 312A. The element 313 thus comprises the register sections corresponding to the element 3 of FIG. 3. Furthermore, via the line 322, the element 312 receives the output signals from comparison device 315 and supplies, if necessary, via the line 319, an output signal which is applied, via the line 203, to the computer 200 in order to branch the computer, if necessary, to a predetermined instruction in the described manner. Furthermore, the element 312 is reset by the TRMN (p. 916 of the systems Handbook) signal which is applied via another conductor of the lines 203/319, and is synchronized by a signal on the line 303 which indicates the status (i.e. "ready" or "not ready") of the memory access operation. Furthermore, the element 316 comprises the mapping table (elements 12, 14, 15 of FIG. 3). In a simpler version, the element 316 only comprises an interface connection, so that in FIG. 3 the line 7 is directly connected to the line 19 (i.e. in this case 320, 321, respectively). The arithmetic unit 314 is then used for combining the address on the line 201 with that from the register extender 313, or the mapping table device addressed thereby, in order to generate the memory address on the output 301. Similarly, the comparison device 315 can generate, by comparison of the data on the lines 201 and 321, an overflow signal or not. The loading of the register extender 313 can be realized via the data line 202; for the sake of brevity, not shown, are the synchronization lines from the cycle control in the element 312 to the mapping table device 316, the comparator 315 and the arithmetic element 314. The mapping table device 316 and the comparator 315 are used for implementing a virtual addressing mode. The extender (312/313) participates, by way of the connection to the lines SCEIN and BIEC, (Systems Handbook, p.9/8) in the communication concerning the status of the computer which can be modified by internal or external interrupt signals. Two line amplifiers 317/318 are also included in the data line 202/302. These line amplifiers can be selectively activated by a signal on the line 299 in order to allow passage of data signals in at the most one of the two directions. By way of the synchronization on the line 303, this conducting can be controlled by the control elements 312, while the signal on the line 319 is applied to the computer as well as to the amplifiers for parallel synchronization.

Figure 6:
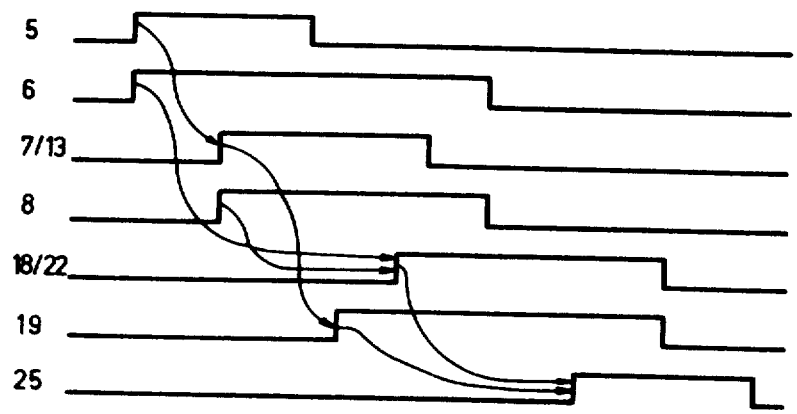
FIG. 6 shows a time diagram relating to FIG. 3.

Finally, FIG. 6 shows a time diagram relating to the device shown in FIG. 3. The arrows indicate the causal connections, while the governing signals must at least be maintained until the consequence thereof has been consolidated. The numbers stated in front of the lines indicate the line numbers.

Figure 7:
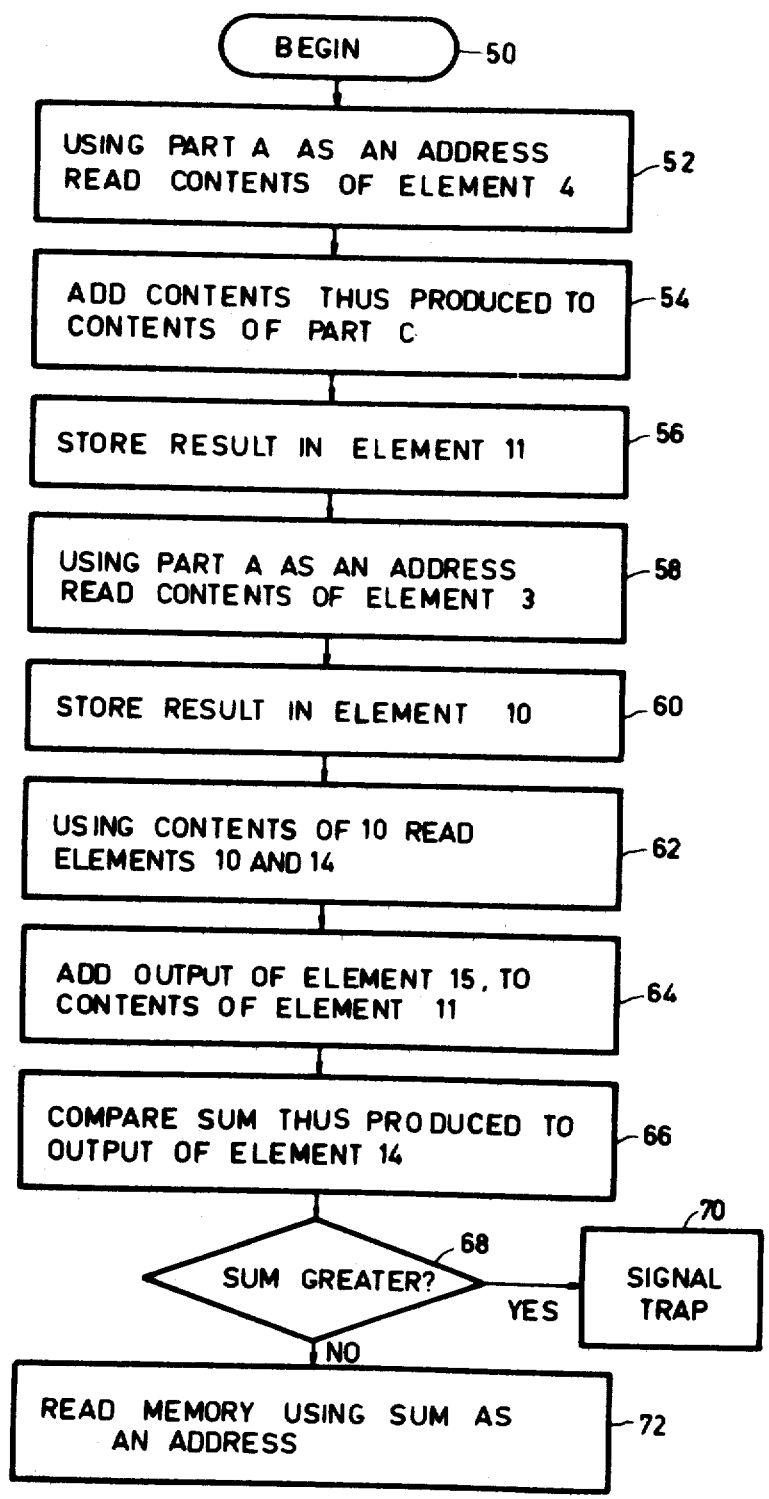
FIG. 7 gives a flow chart of an addressing operation.

FIG. 7 shows a flow chart of the operation of the FIG. 3 arrangement. Block 50 is reached when a memory address (user address) is produced. Blocks 52, 54, 56, 58, 63, 62, 64, 66 are the successive steps explained herebefore. In block 68 the comparison with the segment bound is executed. Block 70 is a signal trap which may be left only by operator action. In block 72 the physical address is produced on the address bus.

What is claimed is:

1. An address generating device for use in a digital data processing system generating a physical address for addressing a segmented random access memory, whereby an increased address length is produced without it being necessary to provide elements within the computer for separate bit slices, said device comprising an instruction register (1) having an input of a predetermined first bit width for a bit string representing an indexed address instruction, said instruction register comprising a first output for an operation code, a second output (5) for selecting an index register from an index register bank (3,4), and a third output (6) for a first relative memory address, wherein the bit width of the index register bank is at least 1.25 and at most said first bit width, said index register bank having a fourth output (7) for outputting a first group of more significant bits therefrom, and a fifth output (8) for outputting a second group of less significant bits therefrom, the second group representing a second relative memory address, said address generating device comprising first adder means (9) for receiving and adding said first and second relative memory addresses to generate on a sixth output (22) thereof a displacement number which in combination with said first group of more significant bits represents a complete logical memory address, wherein said fourth output is connected to an address input of an address segment table (14) memory, each location thereof accomodating a segment base identification to be outputted on a seventh output (19) thereof having a bit width that is at least equal to said first bit width and at most 1.5 times than said address bit width, said address generating device furthermore comprising output adding means receiving from said sixth and seventh outputs the logical memory address and segment base indentification and having an eighth output for thereon outputting an absolute address for said memory.

2. An address generating device as claimed in claim 1 wherein said address segment table (14) device has a storage capacity for a segment upper bound identification, said address segment table (14) device having a ninth output (23) for despatching a segment upper bound identification when a storage location containing this identification is addressed.

* * * * *